Nov. 1, 1949     A. J. A. BESSIERE     2,486,913
CALCULATING APPARATUS FOR GUN BATTERY FIRE COORDINATION
Filed March 27, 1948     5 Sheets-Sheet 1
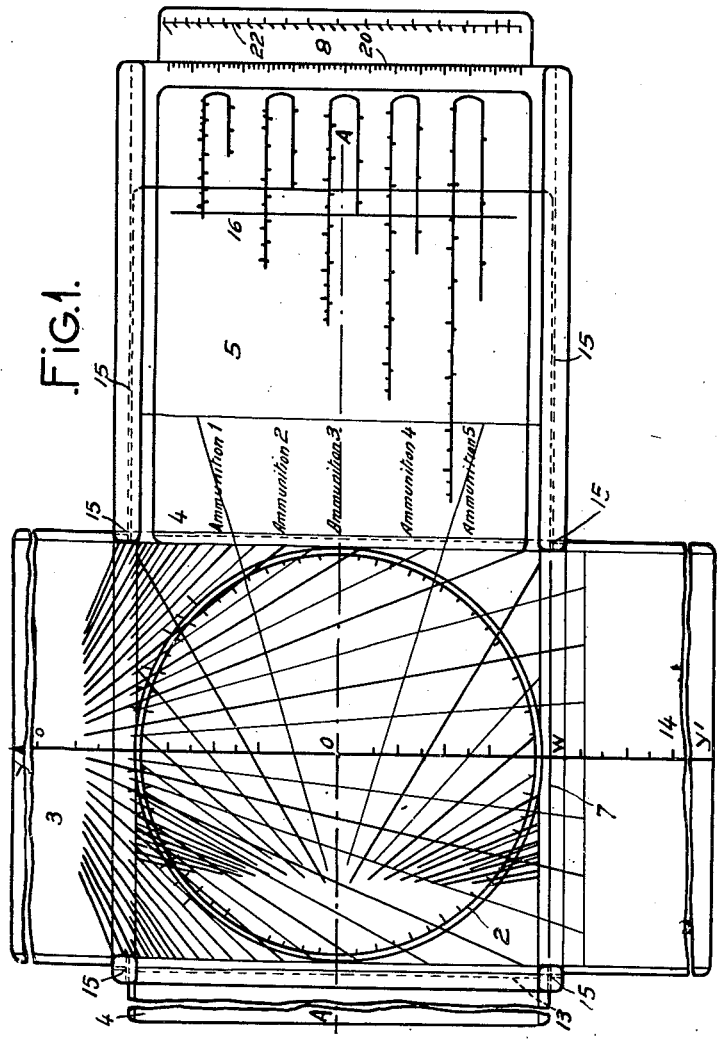
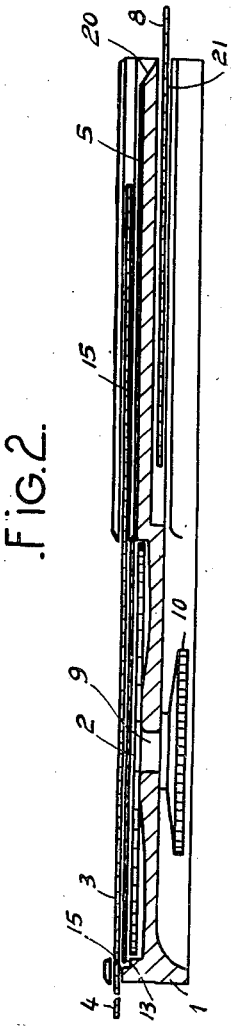
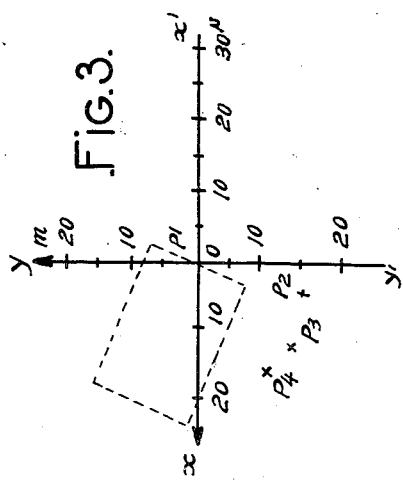
INVENTOR:
ANDRE J. A. BESSIERE
BY:
Haseltine, Lake & Co.
AGENTS

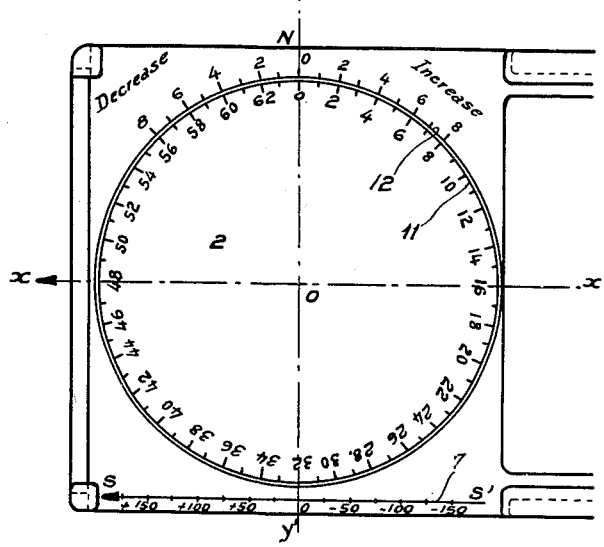

Nov. 1, 1949     A. J. A. BESSIERE     2,486,913
CALCULATING APPARATUS FOR GUN
BATTERY FIRE COORDINATION

Filed March 27, 1948     5 Sheets-Sheet 3

INVENTOR:
ANDRE J. A. BESSIERE
By: Houltine, Lake & Co.
AGENTS

Nov. 1, 1949

A. J. A. BESSIERE
CALCULATING APPARATUS FOR GUN
BATTERY FIRE COORDINATION 2,486,913

Filed March 27, 1948

INVENTOR:

ANDRE J. A. BESSIERE

By:
Hueltine, Lake & Co.

AGENTS

Nov. 1, 1949
A. J. A. BESSIERE
2,486,913
CALCULATING APPARATUS FOR GUN BATTERY FIRE COORDINATION
Filed March 27, 1948
5 Sheets-Sheet 5
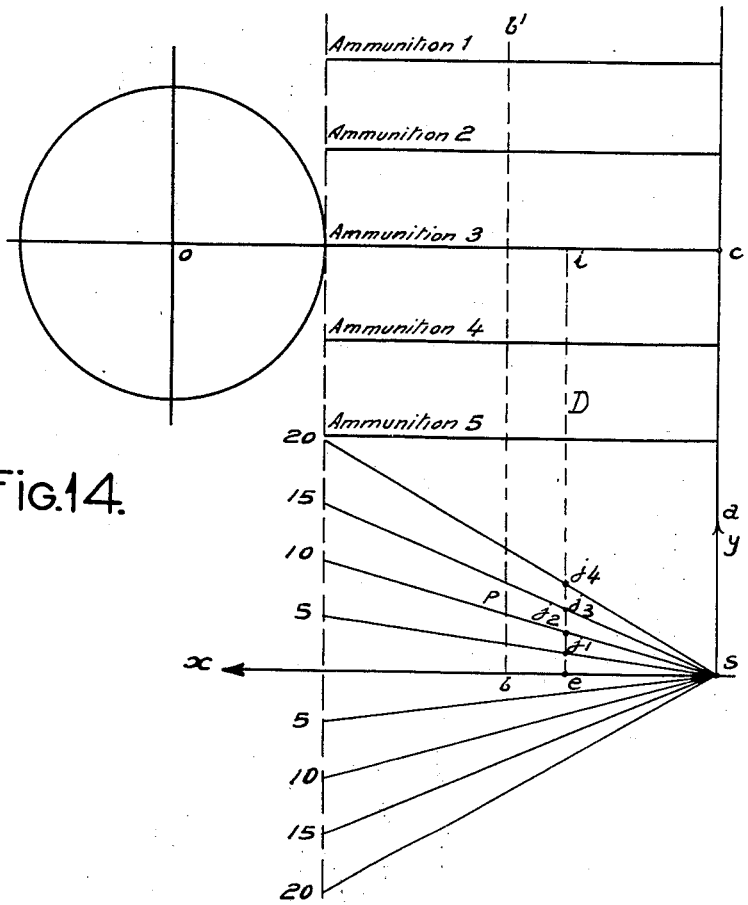
Fig.14.
Fig.15.
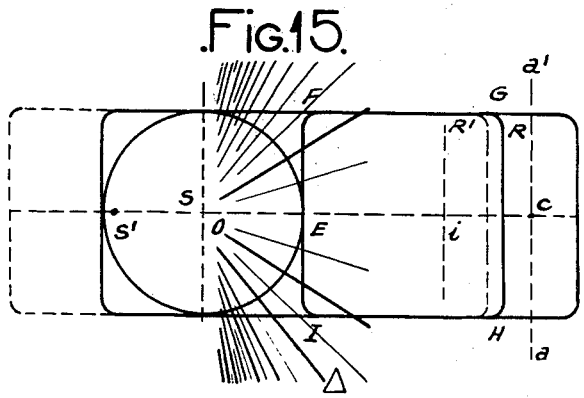
INVENTOR:
ANDRE J. A. BESSIERE
By: Hazeltine, Lake & Co.
AGENTS Patented Nov. 1, 1949

2,486,913

UNITED STATES PATENT OFFICE 2,486,913

CALCULATING APPARATUS FOR GUN BATTERY FIRE COORDINATION

André Joseph Alexandre Bessière, Claunhac, Salles-Courbatiers, France

Application March 27, 1948, Serial No. 17,538
In France April 4, 1947

9 Claims. (Cl. 235—61.5)

The rapid and accurate determination of the firing data of a battery of guns, in the form of a command adapted to be executed simultaneously by the chiefs of each section from basic data pertaining to a point of the target and relative to the base gun station for a given ammunition, gives rise to a problem which is usually resolved only by using rule of thumb methods which provide insufficiently accurate data, or by means of methods more correct but involving an equipment which is intricate, composite and difficult to handle on the field.

My invention has for its object to provide an apparatus for coordinating the fire of all the guns of a battery which ensures a substantially complete solution of this problem in very different conditions by simple and nearly automatic operations requiring neither graphic designs nor computations before firing and the result of which is obtained directly in deflection angle units and elevation angle units.

The essential data used for this determination are of several kinds:

1. Data relative to the target: size, orientation.
2. Position of a well defined point of the target with reference to the base gun station: range, direction,
3. Regular or irregular arrangement of the battery front,
4. Ballistic data: type of ammunition used.

These data finally result in echelon corrections for the whole battery and individual gun corrections, the sum of which constitutes the planimetrical corrections which are usually the most considerable.

If necessary, the following corrections are also determined:

1. Corrections resulting from the altitude differences between the gun stations or between the various parts of the target,
2. Corrections of relative $dV_0$.
3. Relative corrections of flash-hole.

For the sake of clarity, some of the terminology used herein will now be defined.

"$dV_0$" is the variation of the initial velocity of the shell. It is the difference (positive or negative) between the actual velocity of a known shell at the muzzle of a predetermined gun and the theoretical velocity at the muzzle of the same gun as it is given by the firing tables.

This difference is a function of the kind of gun, of the shell and of the atmospheric conditions.

A part of this "variation of initial velocity" is due to the gun's wear relatively to the theoretical gun to which the firing tables correspond. One says that a known gun has a "$dV_0$" of $x$ meters per second, and, thus, one may speak of the "$dV_0$" of a known gun.

As every gun of a battery has its own "$dV_0$", the relative "$dV_0$" of a gun in a battery relatively to the base gun position is the difference between its $dV_0$ and that of the base gun position.

The $dV_0$ of a gun is a function of the gun's wear. In artillery, one usually characterizes the wear of a gun by its "cone lead." The muzzle of a gun tube on the side of the breech where the gun is loaded has a conical shape. This is the loading cone. The shell wedges in said cone when it is driven into the tube through the breech to load the gun. With the wear of the gun, the shell penetrated further and further into the tube when a shell is loaded. The loading cone "leads." The volume of the powder chamber (between the bottom of the shell and the breech of the gun) increases with the wear of the gun. To this increase corresponds a change in the initial velocity. This "lead" of the loading cone has been called "cone lead." It may be measured on the gun and the variations of the initial velocity, i. e. the corresponding so called "$dV_0$" may be given by tables.

The "flash-hole" is the burning fuse fire, i. e. the fire in which the shell explodes somewhere on its trajectory without impact of the shell on any body or on the ground. This bursting is produced on the trajectory due to the action of the fuse of the shell. In order that the bursting of the shell may take place at a predetermined point, the fuse must be prepared accordingly before being introduced into the gun so that it produces the bursting of the shell after a necessary exact time after said shell is expelled from the gun. When preparing the fuse, one says that there is given to the shell a certain "flash-hole."

The "flash-hole" may be quoted in seconds, fractions of a second or in divisions provided on the fuse or on the devices used to produce the "flash-hole."

With the apparatus according to my invention it is also possible by means of different accessories to determine said corrections if necessary.

Said apparatus realizes the representation of the target area on a large scale plane (e. g. $1/_{5000}$) on which the direction and range corrections relative to each gun of the battery are directly read by means of two graduated scales arranged along two right-angled coordinate axes. One axis $x'x$ which is oriented perpendicularly to the line of fire is graduated in deflection angle units and the other axis $y'y$ which is oriented along the line of fire is graduated in elevation angle units, the graduated scale being designed, according to an essential feature of my invention, according to a law varying in terms of the target distance and of the type of ammunition, said law being given by the firetables of the material used.

The annexed drawings (Figs. 1 through 17) show an embodiment of the apparatus. In these drawings:

Fig. 1 shows a plan view of the apparatus,

Fig. 2 shows said apparatus in vertical section along line A—A,

Fig. 3 shows the reference right-angled coordinate system of the target area.

Fig. 4 shows in plan view the circular protractor and the cooperating circular scale of the frame, Fig. 8 shows the target ruler, Fig. 11 is a diagram used to illustrate the operation of the apparatus.

Figure 17:
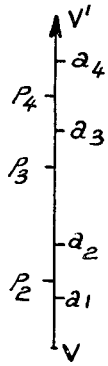
Figure 13:
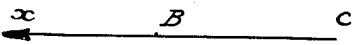
Figure 16:
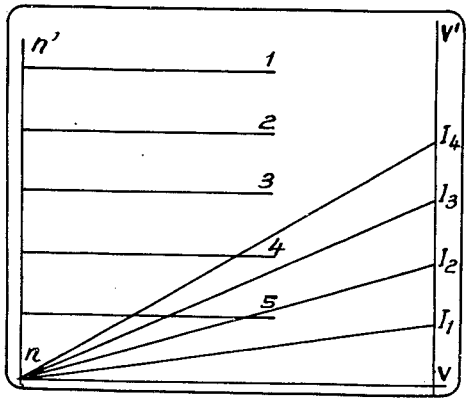

Fig. 12 is a diagram used to illustrate the operation of the apparatus when the method known as the "auxiliary regular front method" is used, Fig. 13 is a diagram illustrating the method of designing a range scale of the range corrector for a given ammunition, Fig. 14 is a diagram illustrating the method of designing the range corrector, Fig. 15 is a diagram intended for showing how the range correction may be directly read on the graduated plan by using simultaneously the range corrector and the range protractor, Fig. 16 is a diagram illustrating the method of designing the muzzle velocity corrector, Fig. 17 shows diagrammatically how the gun stations are plotted in terms of muzzle velocity variations and cone leads on the graduations of the corrector of muzzle velocity for setting said corrector.

The apparatus comprises a frame 1 made of wood, metal, opaque Celluloid or any other suitable material, said frame supporting the following essential parts: a circular protractor 2, a direction protractor 3, a range protractor 4, a range corrector 5, a target rule 6, and following auxiliary parts: the elevation scale 7 and the muzzle velocity corrector 8.

Circular protractor 2 shown in Fig. 4 may be rotated about a vertical axis 9 by means of a knurled knob 10. It is constituted by a white Celluloid plate on which is engraved a circular scale 11 graduated in artillery mils from 0 to 640, e. g. every tenth mil with numbering in multiples of 200 mils (0, 2, 4 . . .).

By rotation of the circular protractor said scale 11 moves relatively to a similar scale 12 provided on the frame around said circular protractor. Scale 12 is symmetrically numbered in multiples of 200 mils (0, 2, 4 . . .) on both sides of point N of axis $y'y$ which materializes the line of fire.

The words "decrease" and "increase" are indicated above scale 12 respectively on the right side and on the left side of axis $y'y$ if the material is one for which a deflection increase results in shifting the point of impact to the left, as in the case of Fig. 4. Said indications would be respectively on the left and on the right in the opposite case.

Figure 5:
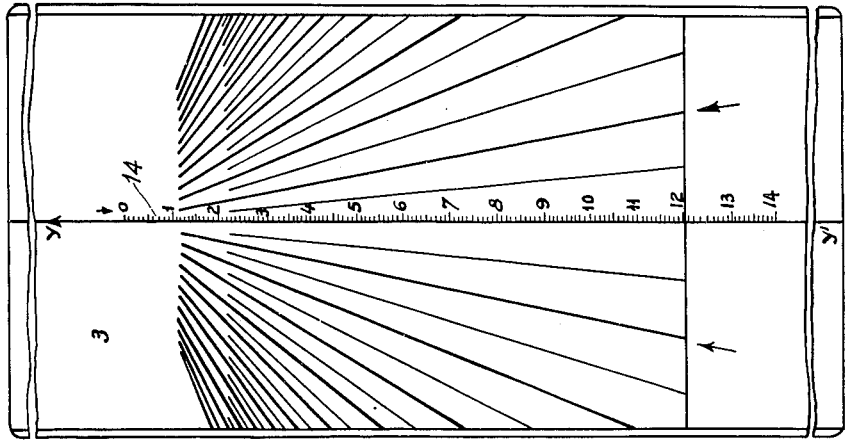
Fig. 5 shows the direction protractor.

Direction protractor 3, shown in Fig. 5, is a transparent Celluloid plate rectangularly shaped and slidable in the direction of the line of fire into grooves 13 provided in the frame.

Longitudinal symmetry axis $y'y$ of direction protractor 3 is graduated in ranges with numbering in thousands of length units (e. g. meters) 0, 1, 2, 3 . . . On both sides of said axis are radii drawn from zero point of the scale and corresponding to parallaxes increasing from 5 to 5 mils. The longitudinal scale adopted for drawing said parallax radii and also used for graduating the symmetry axis, is for example $1/100000$ and does not depend upon the scale chosen for representing the target area whilst the scale adopted in the transversal direction is necessarily the same as the one used for representing the target area (e. g. $1/5000$).

Figure 6:
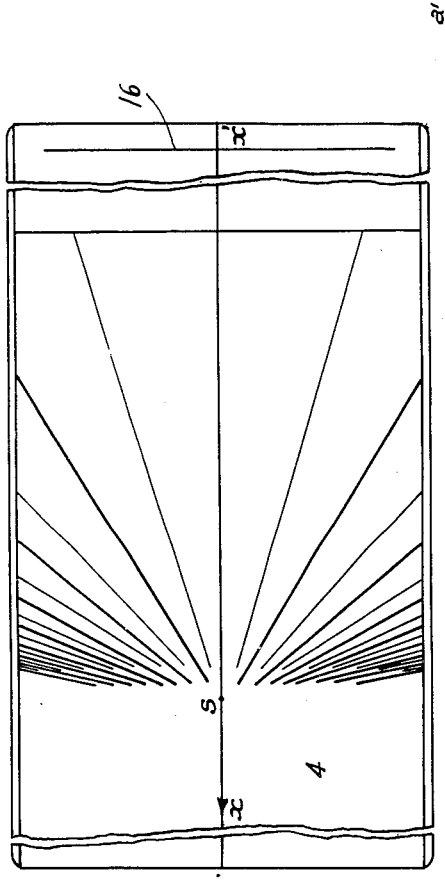
Fig. 6 shows the range protractor.

Range protractor 4 shown in Fig. 6 is a rectangular transparent Celluloid plate which is slidable in direction perpendicular to the line of fire in grooves 15 provided in the frame. On this plate are engraved, on both sides of its longitudinal symmetry axis, radii which are issued from point S and represent range departures increasing from 5 to 5 elevation angle units.

A mark line 16 perpendicular to the symmetry axis is drawn near the end opposite to point S.

Figure 7:
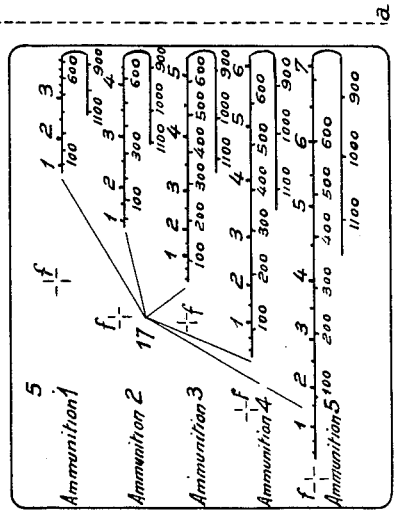
Fig. 7 shows the range corrector.

Range corrector 5 which is rectangularly shaped as shown in Fig. 7 is a small plate made of opaque Celluloid or metal and fixedly secured on the frame and provided with a series of straight parallel scales transversely directed (i. e. perpendicularly to the line of fire) and graduated according to a duplicate range graduation by means of different colours (e. g. red and black) one numbering indicating ranges in thousands of meters with an intermediate line every 500th meter for example, and the other numbering indicating elevation angles in multiples of one hundred units of elevation angle with an intermediate line every 50th unit for example.

As a rule, the number of scales provided is the same as the number of ammunition types to be used with a given material. Each scale comprises moreover an index line $f$.

The methods of designing range protractor 4 and range corrector 5 are specified below.

Target ruler 6, shown in Fig. 8, is a transparent Celluloid plate of small size, intended to represent, on the graduated target plane, the section of the target as defined by the limit initial positions to be given to the fire plane of the base gun and of the adjacent gun.

Edge 18 of ruler 6 is graduated in distances at the scale adopted for representing the target area (e. g. $1/5000$) on both sides of a middle point, which allows to plot on said edge the target depth. This graduation may be also used as a graduated ruler for plotting positions on the graduated plane.

The symmetry axis of the target ruler which passes through $u$ is provided with two distance graduations 19 and 19a, the upper graduation 19 being at a scale reduced to the fourth of the one adopted for representing the target for a 4-gun battery (i. e. $1/20000$ for example), and the lower graduation 19a being at a scale reduced to the third (i. e. $1/15000$ for example) again for a 4-gun battery. Both said graduations are numbered in terms of the target width taken from point $u$.

A red half circle drawn about point $u$ materializes half the zone effectively covered by the projectiles used.

Figure 9:
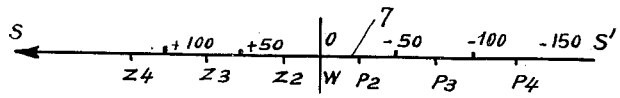
Fig. 9 shows the sight scale.

The sight scale 7 shown in Fig. 9 consists in a graduated scale drawn on the edge of the frame at the foot of the circular protractor and in a direction parallel to $x'x$.

Said graduation is made in terms of altitude at a large scale, usually the same as that adopted for representing the target (1/5000 for example) point $w$ on $y'y$ being taken as starting point of altitude.

Figure 10:
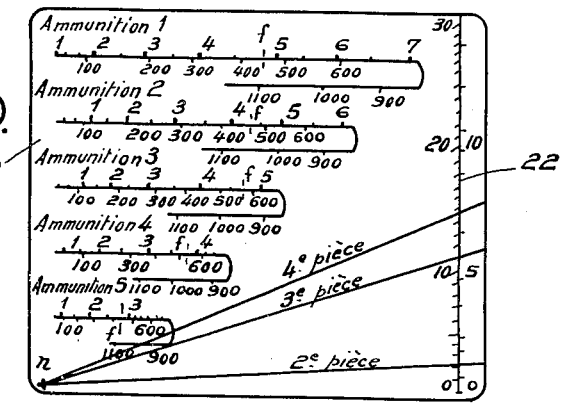
Fig. 10 shows the muzzle velocity corrector.

Muzzle velocity corrector 8, shown in Fig. 10 is a small opaque celluloid or metal rectangular plate which is carried by the frame, as in the case of plate 5, but smoothly slidable transversely in grooves 21 provided in the frame. Said plate comprises a series of straight parallel scales, oriented transversely (perpendicularly to the line of fire) and graduated according to a duplicate range graduation by means of different colours (e. g. red and black) one numbering indicating ranges in thousands of meters, with an intermediate line every 500th meter, for example, and the other numbering indicating elevation angles in multiples of one hundred units of elevation angle, with an intermediate line every 50th unit for example.

As a rule, the number of scales used is the same as the number of ammunition types to be used with a given material.

A scale 22 perpendicular to the ammunition scales is provided with a duplicate graduation in terms of $dV_0$ on the left side and in terms of cone lead on the right side.

On the other hand, muzzle-velocity corrector 8 cooperates with a graduated feather edge 20 of the frame.

The method of designing muzzle-velocity corrector 8 will be explained below.

The essential feature of the apparatus consists in the arrangement of range protractor 4 and range corrector 5. Said arrangement is based on the following considerations:

Assuming that for a given ammunition, the range shifts $\Delta P = CB$, corresponding to a uniform elevation shift of one unit of elevation angle, are plotted at a given scale as abscissae from starting point $C$ on an axis $Cx$ shown in Fig. 15 for the different distances and that the corresponding ranges P are plotted at the points thus obtained, there is so provided a graduation in terms of distance which graphically represents the function $\Delta P = f(N)$ for an elevation shift of one unit of elevation angle.

Assuming that the scales of the same function are similarly drawn in Figure 14 for each ammunition used, on axes parallel to the preceding one and having their starting points $C$ on the same perpendicular line $aa'$, each point of the various axes located on the same perpendicular line $bb'$ represent on their proper graduations thus defined, different distances for which a given range shift corresponds to a given shift of elevation angle.

Assuming that in a coordinate system $Sx$, $Sy$ having $S$ as starting point, a point having $C$ as abscissa and the adopted scale (e. g. 1/5000) as ordinate is plotted, the value $CP$ of the range shift corresponding to an elevation shift of 5 units of elevation angle, then $bP$ is proportional to length $Sb$. When $Sb$ is varied, point $P$ moves therefore along a straight line $SP$ passing through $S$.

Thus the curves corresponding to elevation shifts of 10, 15, 20, 25 units of elevation angles respectively will be straight lines $\Delta$ originating from $S$ and derived from straight line $SP$ by multiplying the ordinates respectively by 2, 3, 4 and 5.

Thence for a given ammunition at a distance $D$ read on the corresponding scale of ranges at $i$, ordinate $ei$ is sliced by the beam of straight lines $\Delta$ originating from $S$ into segments $ej_1$, $ej_2$, $ej_3$, respectively multiples of $ej_1$ ($ej_1$ corresponding to an elevation shift of 5 units) and representing at the adopted scale (e. g. 1/5000) range shift $\Delta P$ which correspond to elevation shifts of 5, 10, 15, 20, 25 units, respectively.

The arrangement provided in my apparatus, by using range protractor 4 together with range corrector 5, permits to re-plot automatically on the graduated plane axis $y'y$ which materializes the direction of fire, said segments $ej_1$, $ej_2$, $ej_3$ ... from the centre of the basic circle in order to obtain the range correction by direct reading.

For this purpose, range corrector 5 is provided with the above described scales graduated in terms of distance, the common starting line of the graduations being a straight line parallel to the outer edge of the corrector (shown at $aa'$ in Figure 15).

The corrector is secured in a fixed position with respect to the basic circle. Straight lines $\Delta$ passing through $S$ are drawn on range protractor 4.

When protractor 4 is placed upon plate 5 by turning it inside out so that axis $Sx$ which was used as a basis for drawing straight lines $\Delta$ is oriented in a direction opposite to that which served to design the graduations, point $S$ falling in $O$, centre of the circle, then the radii originating from $S$ are directed from $O$ towards the corrector.

By construction, the distance between $S$ and index line 16 is the same as length $OC$; point $S$ being at $O$, index line 16 registers then at $R$ with straight line $aa'$ (Fig. 15). If by a translation parallel to $OC$, effected by sliding protractor 4 along grooves 15 of the frame, index line 16 is caused to pass at $R'$ through point $i$ of Figure 14 previously mentioned, then point $S$ will move through a length $OS' = Ci$, so that the axis of fire materialized by $y'y$ on the graduated plane will be sliced by the radii of protractor 4 into segments equal to segments $ej_1$, $ej_2$, $ej_3$ ... and to the symmetrical segments thereof which were previously located in the ordinate of point $i$.

Each graduation in terms of elevation angle associated with a range graduation on the range corrector similarly represents the scale of function $\Delta P = \phi(H)$, as described in connection with Fig. 15, for an elevation shift of one unit of elevation angle, each angle of elevation being inscribed on the scale opposite to the corresponding range.

Muzzle-velocity corrector 8 has been designed in a similar manner. Each scale thereof has been obtained by plotting on Figure 16, for each range from the same ordinate straight line of origin $nn'$, an abscissa proportional to function:

$$\Delta H = g(P)$$

where $\Delta H$ is the shift in elevation angle for range $P$ which corresponds to a value of $dV_0$ taken as a unit for the particular ammunition.

The various values of $dV_0$ taken as units for each ammunition are related to each other. They correspond to the same value of cone lead of a gun as compared with the typical gun of the fire tables. If one ammunition among those used is selected as a basic ammunition, and if a value of $dV_0$ is selected as a unit for said basic ammunition, every other value of $dV_0$ to be taken as unit for every other ammunition is thence determined.

It is advantageous to select as a base that ammunition the muzzle-velocity of which is the nearest to the mean of the muzzle-velocity of the whole and to take as a unit of $dV_0$ for said ammunition a unit length per second (e. g. 1 m. per second). Each graduation in terms of elevation angle associated with a range graduation on the muzzle-velocity corrector similarly represents the scale of function $\Delta H = \psi(H)$ for a variation of muzzle velocity equal to the value of $dV_0$ taken as a unit for the given ammunition, each angle of elevation being inscribed on the scale opposite to the corresponding range.

The zero line of the graduation on the feather edge at the frame end is located on line $nv$ (Fig. 16). Said feather edge acts as an axis of ordinates movable with respect to the plate when sliding.

Assuming that in the coordinate system $(nv, nn')$ of Figure 16, the values of elevation shift $\Delta H$ corresponding to the respective values of $dV_0$ taken as units are plotted on $y$ axis at the scale of the feather edge, the abscissae being those read on the parallel scales, there is obtained a straight line $nl_1$ which is the same for each ammunition.

Similarly straight lines $nl_2, nl_3, nl_4$ derived from $nl_1$ by multiplying the ordinates by 2, 3, 4 . . . correspond for each ammunition to 2, 3, 4 . . . units of $dV_0$ respectively.

Intersecting points $l_1, l_2, l_3, l_4$ of straight lines $nl_1, nl_2, nl_3, nl_4$ with straight line $vv'$ of Figure 16 may be pre-drawn.

At the scale of the feather edge, segment $vl_1$ has a measure in elevation units equal to the measure of $nv$ at its proper scale.

In other words:

$$\frac{vl_1}{nv} = \frac{\mu}{\lambda}$$

Where $\mu$ and $\lambda$ are the measures of the elevation angle unit on the feather edge and on the parallel scales, respectively.

Axis $vv'$ of the muzzle-velocity corrector is thus graduated in terms of $dV_0$ units on its left edge.

These are the actual values of $dV_0$ for the basic ammunition if the $dV_0$ unit selected for said ammunition is the unit of length (e. g. 1 m. per second).

Opposite to said graduation in terms of $dV_0$ on the right edge of axis $vv'$, there is provided the corresponding graduation in terms of cone leads. Thus scale 22 is drawn on $vv'$. A given gun other than the base gun is represented by a point I on scale 22 and therefore by a well defined straight line $nl$ on the muzzle-velocity corrector. If said corrector is adjusted so that scale 20 of the feather edge intersects one of its scales (corresponding to a well defined ammunition) at a point of graduation corresponding to a determined range or elevation angle, the corresponding correction of relative $dV_0$ in units of elevation angle may be read on scale 20 at the point where straight line $nl$ crosses said scale 20.

Index lines $f$ provided on the scales of range corrector 5 and muzzle-velocity corrector 8 are used to determine the relative corrections of flash-hole required by the range differences and by the relative $dV_0$ of the respective guns with respect to the base gun.

Such determination could be obtained by means of a process similar to that used for determining the corrections in elevation angles resulting, as the preceding ones, from the range differences or from the relative $dV_0$. This process has been, however, simplified so that it may be more easily applied. Taking into account that it is unnecessary to know said corrections very accurately, instead of drawing complete graduations, which would constitute for each ammunition the scales of function $$\Delta P = h(P)$$

where $\Delta P$ is the range shift of the point of burst, (1) for a shift of one unit of flash-hole on the range corrector (said unit corresponding either to one second of flash-hole or to one unit of corrector), (2) for a variation of one unit of the relative $dV_0$ on the muzzle-velocity corrector, each one of said graduations has been merely represented by a single line $f$, as shown in Figures 7 and 10, namely the line which has an abscissa equal to the mean of the abscissae corresponding to the range used in practice for time-fuse fire with a particular ammunition.

The operation of my apparatus will be easily understood with reference to the above description. Its use requires following operations:

(1) *Preliminary operations.*—Mark on circular protractor observation direction or directions by means of index lines on the peripheric angular graduation and plot on it the positions of the 2nd, 3rd and 4th gun sections according to their azimuth and range with respect to the 1st gun station located at the centre of the circle, as shown in Figure 11.

Plot on sight scale 7 the 2nd, 3rd and 4th gun stations respectively at $P_2, P_3, P_4$, by means of their respective vertical displacement with respect to the base station assumed to be plotted at W.

Plot on scale 22 of the muzzle-velocity corrector the 2nd, 3rd and 4th stations, respectively at $P_2, P_3, P_4$, the base station being assumed to be plotted at $v$. Plotting point $P_2, P_3, P_4$ is made by marking from $v$ the relative $dV_0$ in $dV_0$ units with respect to the base station. If said $dV_0$ values are unknown, plot the four guns by means of their cone leads at points $a_1, a_2, a_3, a_4$ (see Figure 17) using the right graduation of $vv'$ and derive therefrom points $P_2, P_3, P_4$ by the translation defined by vector $\overline{a_1v}$ ($a_1$ corresponding to the base station).

Draw straight lines $np_2, np_3, np_4$ and mark on each of said lines the number of the gun it represents.

(2) *Operations to be effected just before firing.*—Just before firing, the officer conducting fire receives from the base station the firing data relating to a well defined point of the target. In the following description said point will be assumed to be the mid-point of the right edge of the target as shown in Figure 3.

(a) Rotate the circular protractor so that the direction of fire as read on its graduations passes through point N on axis $y'y$.

(b) Slide protractor 4 so that its index 16 intersects the straight range scale of range corrector 5 corresponding to the ammunition used, at the point representative of the firing angle or range on said scale.

(c) Slide protractor 3 so that the centre O of the circle registers with that graduation of the axial scale of protractor 3 which corresponds to the firing distance.

Under these conditions the radii of protractors 3 and 4 slice on axes $x'x$ and $y'y$ segments originating from O and corresponding respectively to the selected scale and, under the firing conditions, to deflection variations increasing from 5 to 5 mils and to elevation angle variations increasing from 5 to 5 elevation angle units.

(d) The individual corrections in direction and in range, respectively, which must be transmitted to each gun station in order to achieve concentration of the barrage are then read in magnitude as well as in sign by determining at a rough estimate the projections of vectors $\overline{P_2O}$, $\overline{P_3O}$, $\overline{P_4O}$ on axes $x'x$ and $y'y$.

For aiming the fire on the target so as to position each gun right on its target portion, the echelon direction and range corrections are obtained by means of the target ruler. By placing said ruler upon the plane of the figure, zero point being at O and axis $uu'$ being oriented along the axis of the circular protractor corresponding to the target direction, and by plotting point F corresponding on the upper scale of said axis to the given value of the target front, the projections of vector $\overline{OF}$ on $x'x$ and $y'y$, respectively, give the desired corrections.

Said corrections, when added to the individual corrections previously measured, give the overall corrections to be applied to the base gun data to obtain the data for the other guns, thus positioning the battery on the middle line of the target.

Concerning sweeping fire the firing mechanism "by $n$ rounds sweep $m$ mils" may be obtained by merely reading number of mils $m$ on the $x'x$ graduation of the radius of the "red half-circle" of the target ruler and by determining at a rough estimate the number $n$ of rounds distant from each other by intervals equal to $m$ on the projection of $\overline{OF}$ on $x'x$.

It will be easily understood that if the sweeping is effected by turns or turn portions of the training wheel and not by mils it will be possible to determine in a somewhat similar way the number of turns $t$ and the number of rounds $n$th.

(e) It is easy to obtain with my apparatus the elevations to be transmitted to each station from the mean elevation, by means of segment $Og$ sliced on $x'x$ by the radius of the range protractor corresponding to a parallax of 10 mils (marked with a small arrow) said range protractor being always disposed in the original position mentioned in paragraph c above.

If $1/100$ of the range is admitted as a permanent approximate value of the half-bracket, then said segment constitutes at the adopted scale a measure of the half-bracket value.

Therefore it will be easy to determine at a rough estimate the positions of the elevations on the right edge of the target materialized by the right edge of the target ruler disposed as stated above and to read on the axes in a convenient way, the elevation shifts and direction shifts common to all stations and required to shift from the mean elevation to the other elevations.

(f) In the general case when the lines parallel to the target front and to which theoretically correspond the data determined for the elevations are horizontal or considered as such, the sight corrections are reduced to the measure in mils of segments $\overline{P_2w}$, $\overline{P_3w}$, $\overline{P_4w}$, on the sight scale by means of direction protractor 3 after said protractor has been adjusted so that the graduation of its axis corresponding to the firing distance is brought in registration with $w$.

In the other cases, I measure in a similar way segments $\overline{P_2z_2}$, $\overline{P_3z_3}$, $\overline{P_4z_4}$, $z_2$, $z_3$, $z_4$ representing on the site scale the relative elevations (assumed to be known) of the target portion of each gun with respect to the elevation of the first gun target portion with every possible simplification assuming that the transversal slopes of the target from battery front are uniform.

(g) The corrections required by the relative $dV_0$ of the guns with respect to the base gun are measured by means of the muzzle-velocity corrector.

Slide the muzzle-velocity corrector along grooves 21 so that feather edge 20 intersects the corrector scale corresponding to the ammunition used at the point indicating the firing distance on said scale (or at the point indicating the angle of fire if the firing distance has not been given).

Under these conditions each straight line $np_2$, $np_3$, $np_4$ intersects the feather edge at a well defined point $p$. The reading on the feather edge at this point is the desired correction for the corresponding gun in elevation angle units.

(h) Read then eventually the flash-hole relative corrections resulting from the range differences on axis $y'y$, similarly to the corrections of elevation angle resulting from the range differences, after having adjusted protractor 4 so as to cause index 16 to pass through the suitable $f$ line of said corrector, and the flash-hole relative corrections, resulting from the relative $dV_0$ on scale 20, similarly to the corrections of elevation angle resulting from the relative $dV_0$, after having adjusted the muzzle-velocity corrector so as to bring scale 20 in registration with the suitable $f$ line of said corrector.

The apparatus by coordinating fire according to my invention presents, numerous advantages among which the following ones may be mentioned inter alia.

(1) It lends itself to a very advantageous alternative of the normal method described above, namely that of the "auxiliary regular front." The insertion of a fictitious auxiliary regular battery front, near to the actual front (when said actual front is not regular) does not allow to effect the desired positioning by means of a single echelon correction, corresponding to the auxiliary regular front, said correction being added to the individual corrections of the guns required to pass from the actual positions to the fictitious positions. Moreover by suitably determining said auxiliary regular front, the individual corrections may be reduced in number and magnitude.

Thus in Figure 12 where the auxiliary regular front defined by the 1st and 4th actual gun stations has been adopted, only two individual corrections need to be effected.

In this figure $A_2$ and $A_3$ represent the positions of the 2nd and 3rd guns of the auxiliary regular front, $m$ is the symmetrical point of $A_2$ with respect to O and $p_2$ and $p_3$ are points for which vectors $\overline{Op_2}$, $\overline{Op_3}$ are equipollent with $\overline{P_2A_2}$, $\overline{P_3A_3}$ (once $m$, $p_2$, $p_3$ are plotted the dotted parts may be rubbed away).

The common echelon correction is represented in direction and range by the coordinates of point $f$ and the individual corrections are represented by the coordinates of point $p_2$ and $p_3$.

(2) The corrections may be measured by means of my apparatus whichever may be the base point chosen on the target and the data of which are given to the base gun: centre, straight or incurved limit, mid-point of right edge, etc. The mid-point of the right edge of the target may be conveniently used as in the case assumed above for explaining the operation of the apparatus and as shown in Figure 3, but the apparatus is clearly adapted to resolve the problem as well when any other point is chosen as a base point.

(3) The dual width graduation of the target ruler allows to form the barrage at will, either to position each gun exactly on a target portion or to distribute the guns evenly along the target front so that the right gun has its mean point on the right of the target while the left gun has its mean point on the left of the target (moreover the target may be fictitious when it is merely desired to beat a zone of a given width). In the first case the upper scale ($1/20000$) is used; in the second case the lower scale ($1/15000$) is used.

(4) My apparatus may be used for vertical fire under the same conditions as for plunging fire.

Referring to the fire-tables it may be seen that the value of the range shift for a given elevation shift is, neglecting the direction, substantially the same in the case of the vertical fire as in the case of the plunging fire, which means that the function:

$$AP = f(P)$$

for an elevation angle variation of one unit of elevation angle is represented by the same scale for both kinds of fire.

It would therefore be immaterial to consider whether the fire is plunging or vertical for determining the range corrections, except with respect to their direction if the range is always indicated with the command. Now in the case where the officer conducting fire knows only the angle of fire (which he necessarily assimilates with the elevation angle) he has no other alternative than looking on the scale corresponding to the ammunition used for the representation in elevation angle of function $f(P)$. Said representation must be designed for vertical fire as well as for plunging fire.

However to avoid overlapping of both graduations, that of the vertical fire is provided on a scale parallel to the plunging fire scale and corrected with respect thereto through a bent element.

The apparatus according to this invention is adapted to be used for coordinating the fire of batteries or groups composed of any known material: guns, howitzers, mortars, self-propelling projectiles, machine-guns.

Its dimensions may vary according to the range of the material, the number of guns of the battery, the accuracy desired, the conditions of use foreseen, etc.

My apparatus is particularly useful for the officer commanding fire of field artillery and at the $1/5000$ scale adopted it is highly accurate, it is not very cumbersome (180 x 90 mm.) and may be easily carried in the pocket with its accessories within a suitable case.

The same apparatus may be used for several different materials. For this purpose it is sufficient to dispose for each material of suitable range and muzzle-velocity correctors. Designed at the same scale with the same dimensions they may be fitted on a single frame.

The units mentioned in the above description, units of length for range and muzzle-velocity, units of deflection, units of elevation and units of flash-hole may vary according to the material used.

The minor arrangements relating to mounting of the apparatus parts may also be modified.

The same holds true in respect of the graduation scales which may be chosen so that they correspond to the desired dimensions, to the magnitude of the units of deflection, elevation, flash-hole and length used.

Similarly the radii of protractors 3 and 4 may correspond to angles of deflection and elevation, respectively, varying not from 5 to 5 units but in a different manner (from 10 to 10, from 20 to 20, etc.) according to the materials used.

For a number of guns greater than four the graduations of the symmetry axis of the target ruler must be drawn at a different scale. For a six-gun battery, for example, the upper graduation will be drawn at $1/8$ and the lower graduation at $1/5$ of the scale adopted for representing the target plane.

As a matter of fact there is no objection to the ruler being provided with several pairs of parallel graduations, each of said graduation pairs being used for a given number of guns.

I claim:

1. An apparatus for coordinating the fire of a battery of guns one of which is selected as a base gun, and comprising a fixed frame covered with a flat surface provided with two right-angled graduations one of which is graduated in ranges and materializes the direction of fire, the other one being graduated in deflections, a circular graduation provided on said frame, a circular protractor applied on the frame and movable about an axis perpendicular to the frame plane, said protractor being provided with a circular graduation opposite to the similar graduation of the frame, a direction protractor made of a transparent substance slidable on the frame along the fire direction, a range protractor made of a transparent substance slidable on the frame along the direction perpendicular to the direction of fire, a range corrector secured on the frame and provided with a plurality of straight parallel scales oriented in the direction perpendicular to the direction of fire, graduated in ranges and each corresponding to a well-defined ammunition, a muzzle-velocity corrector slidable on the frame along the direction perpendicular to the direction of fire and provided with a plurality of straight parallel scales directed perpendicularly to the direction of fire, graduated in ranges and each corresponding to a well-defined ammunition, and with a scale perpendicular to said ammunition scales graduated in muzzle-velocity differences, means to combine the relative shifts of the circular protractor, of the direction protractor, of the range protractor and of the range corrector, thereby to read directly on the frame the battery firing data relating to the base gun position including the individual range corrections of the other guns in units of elevation angle and the individual direction corrections of the other guns in units of deflection angle, and means to measure, with the muzzle-velocity corrector, the individual range corrections resulting from departures of the muzzle-velocities of the other guns with respect to the muzzle-velocity of the base gun.

2. An apparatus for coordinating the fire of a battery of guns one of which is selected as a base gun, and comprising a fixed frame covered with a flat surface provided with two right-angled graduations one of which is graduated in ranges and materializes the direction of fire, the other one being graduated in deflections, a circular graduation provided on said frame, a circular protractor applied on the frame and movable about an axis perpendicular to the frame plane, said protractor being provided with a circular graduation opposite to the similar graduation of the frame, a direction protractor made of a transparent substance slidable on the frame along the fire direction, a range protractor made of a transparent substance slidable on the frame along the direction perpendicular to the direction of fire having, on both sides of its symmetry axis, radial markings originating from a starting point representing range departures corresponding to equal shifts of elevation angle, an index line drawn on said range protractor perpendicularly to its symmetry axis, a range corrector secured on the frame and provided with a plurality of straight parallel scales oriented in the direction perpendicular to the direction of fire, graduated in ranges and each corresponding to a well-defined ammunition, a muzzle-velocity corrector slidable on the frame along the direction perpendicular to the direction of fire and provided with a plurality of straight parallel scales directed perpendicularly to the direction of fire, graduated in ranges and each corresponding to a well-defined ammunition, and a scale perpendicular to said ammunition scales graduated in muzzle-velocity differences, means to combine the relative shifts of the circular protractor, of the direction protractor, of the range protractor and of the range corrector, thereby to read directly on the frame the battery firing data relating to the base gun position including, the individual range corrections of the other guns in units of elevation angle and the individual direction corrections of the other guns in units of deflection angle, and means to measure, with the muzzle-velocity corrector, the individual range corrections resulting from departures of the muzzle-velocities of the other guns with respect to the muzzle-velocity of the base gun.

3. An apparatus for coordinating the fire of a battery of guns one of which is selected as a base gun, and comprising a fixed frame covered with a flat surface provided with two right-angled graduations one of which is graduated in ranges and materializes the direction of fire, the other one being graduated in deflections, a circular graduation provided on said frame, a circular protractor applied on the frame and movable about an axis perpendicular to the frame plane, said protractor being provided with a circular graduation opposite to the similar graduation of the frame, a direction protractor made of a transparent substance slidable on the frame along the fire direction and having along its longitudinal axis of symmetry a scale graduated in ranges and, on both sides of said axis of symmetry, radial markings originating from the starting point of the graduated scale representing parallaxes increasing in regular steps, a range protractor made of a transparent substance slidable on the frame along the direction perpendicular to the direction of fire having, on both sides of its symmetry axis, radial markings originating from a starting point representing range departures corresponding to equal shifts of elevation angle, an index line drawn on said range protractor perpendicularly to its symmetry axis, a range corrector secured on the frame and provided with a plurality of straight parallel scales oriented in the direction perpendicular to the direction of fire, graduated in ranges and each corresponding to a well-defined ammunition, a muzzle-velocity corrector slidable on the frame along the direction perpendicular to the direction of fire and provided with a plurality of straight parallel scales directed perpendicularly to the direction of fire, graduated in ranges and each corresponding to a well-defined ammunition, and with a scale perpendicular to said ammunition scales graduated in muzzle-velocity differences, means to combine the relative shifts of the circular protractor, of the direction protractor, of the range protractor and of the range corrector thereby to read directly on the frame, the battery firing data relating to the base piece gun position including the individual range corrections of the other guns in units of elevation angle and the individual direction corrections of the other guns in units of deflection angle, and means to measure, with the muzzle-velocity corrector, the individual range corrections resulting from departures of the muzzle-velocities of the other guns with respect to the muzzle-velocity of the base gun.

4. An apparatus for coordinating the fire of a battery of guns one of which is selected as a base gun, and comprising a fixed frame covered with a flat surface provided with two right-angled graduations one of which is graduated in ranges and materializes the direction of fire, the other one being graduated in deflections, a circular graduation provided on said frame, a graduated bevel on one edge of said frame parallel to the direction of fire a circular protractor applied on the frame and movable about an axis perpendicular to the frame plane, said protractor being provided with a circular graduation opposite to the similar graduation of the frame, a direction protractor made of a transparent substance slidable on the frame along the fire direction and having along its longitudinal axis of symmetry a scale graduated in ranges and, on both sides of said axis of symmetry, radial markings originating from the starting point of the graduated scale representing parallaxes increasing in regular steps, a range protractor made of a transparent substance slidable on the frame along the direction perpendicular to the direction of fire having, on both sides of its symmetry axis, radial markings originating from a starting point representing range departures corresponding to equal shifts of elevation angle, an index line drawn on said range protractor perpendicularly to its symmetry axis, a range corrector secured on the frame and provided with a plurality of straight parallel scales oriented in the direction perpendicular to the direction of fire, graduated in ranges and each corresponding to a well-defined ammunition, a muzzle-velocity corrector slidable on the frame along the direction perpendicular to the direction of fire and provided with a plurality of straight parallel scales directed perpendicularly to the direction of fire, graduated in ranges and each corresponding to a well-defined ammunition, and with a scale perpendicular to said ammunition scales graduated in muzzle-velocity differences, means to combine the relative shifts of the circular protractor, of the direction protractor, of the range protractor and of the range corrector for reading directly on the frame the battery firing relating to the base gun position including the individual range corrections of the other guns in units of elevation angle and the individual direction corrections of the other guns in units of deflection angle, and means to measure, with the muzzle-velocity corrector, the individual range corrections resulting from departures of the muzzle-velocities of the other guns with respect to the muzzle-velocity of the base gun.

5. An apparatus for coordinating the fire of a battery of guns one of which is selected as a base gun, and comprising a fixed frame covered with a flat surface provided with two right-angled graduations one of which is graduated in ranges and materializes the direction of fire, the other one being graduated in deflections, a circular graduation provided on said frame, a graduated bevel on one edge of said frame parallel to the direction of fire, a circular protractor applied on the frame and movable about an axis perpendicular to the frame, said protractor being provided with a circular graduation opposite to the similar graduation of the frame, a direction protractor made of a transparent substance slidable on the frame along the fire direction and having along its longitudinal axis of symmetry a scale graduated in ranges and, on both sides of said axis of symmetry radial markings originating from the starting point of the graduated scale representing parallaxes increasing in regular steps, a range protractor made of a transparent substance slidable on the frame along the direction perpendicular to the direction of fire having, on both sides of its symmetry axis, radial markings originating from a starting point representing range departures corresponding to equal shifts of elevation angle, an index line drawn on said range protractor perpendicularly to its symmetry axis, a range corrector secured on the frame and provided with a plurality of straight parallel scales oriented in the direction perpendicular to the direction of fire, graduated in ranges and each corresponding to a well-defined ammunition, whereby upon orienting the circular protractor according to the required direction of fire, sliding the range protractor so that its index line intersects the straight scale corresponding to the ammunition used at the point representative of the firing distance on said scale and sliding the direction protractor so as to bring in registration the center of the circular protractor and the graduations of the range protractor indicating the firing distance, it is possible to read directly on the frame in units of elevation angle the individual range corrections of all the guns of the battery and in units of deflection angle the individual direction corrections of all the guns of the battery; and a muzzle-velocity corrector slidable on the frame along the direction perpendicular to the direction of fire and provided with a plurality of straight parallel scales directed perpendicularly to the direction of fire, graduated in ranges and each corresponding to a well-defined ammunition, and with a scale perpendicular to said ammunition scales graduated in muzzle-velocity differences; said muzzle-velocity corrector cooperating with the graduated bevel provided on the frame whereby it is possible to measure by a direct reading on the muzzle-velocity corrector the individual range corrections resulting from the departures of the muzzzle velocities of the other guns with respect to the muzzle-velocity of the base gun.

6. An apparatus for coordinating the fire of a battery of guns one of which is selected as a base gun, and comprising a fixed frame covered with a flat surface provided with two right-angled graduations one of which is graduated in ranges and materializes the direction of fire, the other one being graduated in deflections, a circular graduation provided on said frame, a graduated bevel on one edge of said frame parallel to the direction of fire, a circular protractor applied on the frame and movable about an axis perpendicular to the frame, said protractor being provided with a circular graduation opposite to the similar graduation of the frame, a direction protractor made of a transparent substance slidable on the frame along the fire direction and having along its longitudinal axis of symmetry a scale graduated in ranges and, on both sides of said axis of symmetry, radial markings originating from the starting point of the graduation, said radii representing parallaxes increasing in regular steps, a range protractor made of a transparent substance slidable on the frame along the direction perpendicular to the direction of fire having, on both sides of its symmetry axis, radial markings originating from a starting point representing range departures corresponding to equal shifts of elevation angle, an index line drawn on said range protractor perpendicularly to its symmetry axis, a range corrector secured on the frame, graduated in ranges and each corresponding to a well-defined ammunition, the graduations thereof being so designed that for different ammunitions the points occupying on said scales the same relative positions with respect to the index line correspond to a same range shift for a same elevation shift, and with a plurality of index points each of which is located on one of said scales, the position of each index point being fixed so that when the straight index line of the range protractor registers therewith, the corrector gives the relative corrections of flash-hole resulting from the differences of range with a sufficient accuracy within the whole band of ranges normally used with the ammunitions used; the arrangement of all the above mentioned elements on the frame being such that upon orienting the circular protractor according to the required direction of fire, sliding the range protractor so that its index line intersects the straight scale corresponding to the ammunition used at the point representative of the firing distance on said scale and sliding the direction protractor so as to bring in registration the center of the circular protractor and the graduations of the range protractor indicating the firing distance, it is possible to read directly on the frame in units of elevation angle the individual range corrections of all the guns of the battery and in units of deflection angle the individual direction corrections of all the guns of the battery; and a muzzle-velocity corrector slidable on the frame along the direction perpendicular to the direction of fire and provided with a plurality of straight parallel scales directed perpendicularly to the direction of fire, graduated in ranges and each corresponding to a well-defined ammunition, and with a scale perpendicular to said ammunition scales graduated in muzzle-velocity differences, the graduations of the ammunition scales being designed so that for different ammunitions the points occupying on said scales the same relative positions with respect to the muzzzle-velocity scale correspond to a same elevation shift for a same value of cone lead of the firing piece with respect to the reference piece of the fire-tables, and with a plurality of index points each of which is located on one of said scales, the position of each index point being fixed so that when the straight index line of the range protractor registers therewith, the corrector gives the relative corrections of flash-hole resulting from the differences of range with a sufficient accuracy within the whole band of ranges normally used with the ammunitions used, said muzzle-velocity scale cooperating with the graduated bevel provided on the frame to enable a direct reading on the muzzle-velocity corrector of the individual corrections resulting from the departures of the muzzle-velocities of the other guns with respect to the muzzle-velocity of the base gun.

7. An apparatus for coordinating the fire of a battery of guns one of which is selected as a base gun, and comprising a fixed frame covered with a flat surface provided with two right-angled graduations one of which is graduated in ranges and materializes the direction fire, the other one being graduated in deflections, a circular graduation provided on said frame, a graduated bevel on one edge of said frame parallel to the direction of fire, a circular protractor applied on the frame and movable about an axis perpendicular to the frame, said protractor being provided with a circular graduation opposite to the similar graduation of the frame, a direction protractor made of a transparent substance slidable on the frame along the fire direction and having along its longitudinal axis of symmetry a scale graduated in ranges and, on both sides of said axis of symmetry radial markings originating from the starting point of the graduated scale representing parallaxes increasing in regular steps, a range protractor made of a transparent substance slidable on the frame along the direction perpendicular to the direction of fire having, on both sides of its symmetry axis, radial markings originating from a starting point representing range departures corresponding to equal shifts of elevation angle, an index line drawn on said range protractor perpendicularly to its symmetry axis, a range corrector secured on the frame and provided with a plurality of straight parallel scales oriented in the direction perpendicular to the direction of fire, graduated in ranges and each corresponding to a well-defined ammunition, the graduations thereof being so designed that for different ammunitions the points occupying on said scales the same relative positions with respect to the index line correspond to a same range shift for a same elevation shift, and with a plurality of index points each of which is located on one of said scales, the position of each index point being fixed so that when the straight index line of the range protractor registers therewith the corrector gives the relative corrections of flash-hole resulting from the differences of range with a sufficient accuracy within the whole band of ranges normally used with the ammunitions used; the arrangement of all the above mentioned elements on the frame being such that upon orienting the circular protractor according to the required direction of fire, sliding the range protractor so that its index line intersects the straight scale corresponding to the ammunition used at the point representative of the firing distance on said scale and sliding the direction protractor so as to bring in registration the center of the circular protractor and the graduations of the range protractor indicating the firing distance, it is possible to read directly on the frame in units of elevation angle the individual range corrections of all the guns of the battery and in units of deflection angle the individual direction corrections of all the guns of the battery; and a muzzle-velocity corrector slidable on the frame along the direction perpendicular to the direction of fire and provided with a plurality of straight parallel scales directed perpendicularly to the direction of fire, graduated in ranges and each corresponding to a well-defined ammunition, and with a scale perpendicular to said ammunition scales graduated in muzzle-velocity differences, the graduations of the ammunition scales being designed so that for different ammunitions the points occupying on said scales the same relative positions with respect to the muzzle-velocity scale correspond to a same elevation shift for a same value of cone lead of the related gun with respect to the reference gun of the fire-tables, and with a plurality of index points each of which is located on one of said scales, the position of each index point being fixed so that when the straight index line of the range protractor registers therewith, the corrector gives the relative corrections of flash-hole resulting from the differences of range with a sufficient accuracy within the whole band of ranges normally used with the ammunitions used, said muzzle-velocity scale cooperating with the graduated bevel provided on the frame to enable a direct reading on the muzzle-velocity corrector of the individual corrections resulting from the departures of the muzzle-velocities of the other guns with respect to the muzzle-velocity of the base gun, a straight scale provided on the frame being used as sight axis for determining the elevation corrections resulting from the altitude differences and/or between the various parts of the target.

8. An apparatus for coordinating the fire of a battery of guns one of which is selected as a base gun, and comprising a fixed frame covered with a flat surface provided with two right-angled graduations one of which is graduated in ranges and materializes the direction of fire, the other one being graduated in deflections, a circular graduation provided on said frame, a graduated bevel on one edge of said frame parallel to the direction of fire, a circular protractor applied on the frame and movable about an axis perpendicular to the frame, said protractor being provided with a circular graduation opposite to the similar graduation of the frame, a direction protractor made of a transparent substance slidable on the frame along the fire direction and having along its longitudinal axis of symmetry a scale graduated in ranges and, on both sides of said axis of symmetry radial markings originating from the starting point of the graduated scale representing parallaxes increasing in regular steps, a range protractor made of a transparent substance slidable on the frame along the direction perpendicular to the direction of fire having, on both sides of its symmetry axis, radial markings originating from a starting point representing range departures corresponding to equal shifts of elevation angle, an index line drawn on said range protractor perpendicularly to its symmetry axis, a range corrector secured on the frame and provided with a plurality of straight parallel scales oriented in the direction perpendicular to the direction of fire, graduated in ranges and each corresponding to a well-defined ammunition, the graduations thereof being so designed that for different ammunitions the points occupying on said scales the same relative positions with respect to the index line correspond to and with a same range shift for a same elevation shift, a plurality of index points each of which is located on one of said scales, the position of each index point being fixed so that when the straight index line of the range protractor registers therewith, the corrector gives the relative corrections of flash-hole resulting from the differences of range with a sufficient accuracy within the whole band of ranges normally used with the ammunitions used; the arrangement of all the above mentioned elements on the frame being such that upon orienting the circular protractor according to the required direction of fire, sliding the range protractor so that its index line intersects the straight scale corresponding to the ammunition used at the point representative of the firing distance on said scale and sliding the direction protractor so as to bring in registration the center of the circular protractor and the graduations of the range protractor indicating the firing distance, it is possible to read directly on the frame in units of elevation angle the individual range corrections of all the guns of the battery and in units of deflection angle the individual direction corrections of all the guns of the battery; and a muzzle-velocity corrector slidable on the frame along the direction perpendicular to the direction of fire and provided with a plurality of straight parallel scales directed perpendicularly to the direction of fire, graduated in ranges and each corresponding to a well-defined ammunition, and with a scale perpendicular to said ammunition scales graduated in muzzle-velocity differences, the graduations of the ammunition scales being designed so that for different ammunitions the points occupying on said scales the same relative positions with respect to the muzzle-velocity scale correspond to a same elevation shift for a same value of cone lead of the related gun with respect to the reference gun of the fire-tables, and with a plurality of index points each of which is located on one of said scales, the position of each index point being fixed so that when the straight index line of the range protractor registers therewith, the corrector gives the relative corrections, of flash-hole resulting from the differences of range with a sufficient accuracy within the whole band of ranges normally used with ammunitions used, said muzzle velocity scale cooperating with the graduated bevel provided on the frame to obtain a direct reading on the muzzle-velocity corrector of the individual corrections resulting from the departures of the muzzle-velocities of the other guns with respect to the muzzle-velocity of the base gun, a straight scale being provided on the frame as sight axis for determining the elevation corrections resulting from the altitude differences between pieces and/or the various parts of the target, a target ruler provided on the frame and the edge of which comprises a graduation relating to the depth of the target and the symmetry axis of which is provided with a dual graduation relating to the width of the target, one of the graduations being intended for the case where the width of the covered zone is equal to the target front and the other for the case where the width of the covered zone is equal to between ¾ and ⅝ of the target front.

9. An apparatus for coordinating the fire of a battery of guns one of which is selected as a base gun, and comprising a fixed frame covered with a flat surface provided with two right-angled graduations one of which is graduated in ranges and materializes the direction of fire, the other one being graduated in deflections, a circular graduation provided on said frame, a graduated bevel on one edge of said frame parallel to the direction of fire, a circular protractor applied on the frame and movable about an axis perpendicular to the frame, said protractor being provided with a circular graduation opposite to the similar graduation of the frame, a direction protractor made of a transparent substance slidable on the frame along the fire direction and having along its longitudinal axis of symmetry a scale graduated in ranges and, on both sides of said axis of symmetry radial markings originating from the starting point of the graduated scale representing parallaxes increasing in regular steps, a range protractor made of a transparent substance slidable on the frame along the direction perpendicular to the direction of fire having, on both sides of its symmetry axis, radial markings originating from a starting point representing range departures corresponding to equal shifts of elevation angle, an index line drawn on said range protractor perpendicularly to its symmetry axis, a range corrector secured on the frame and provided with a plurality of straight parallel scales oriented in the direction perpendicular to the direction of fire, graduated in ranges each corresponding to a well-defined ammunition, said scales being return bent in such a way that one portion of the scale is adapted to plunging fire while the other portion is adapted to vertical fire and the graduations thereof being so designed that for different ammunitions the points occupying on said scales the same relative positions with respect to the index line correspond to a same range shift for and with a same elevation shift, a plurality of index points each of which is located on one of said scales, the position of each index point being fixed so that when the straight index line of the range protractor registers therewith, the corrector gives the relative corrections of flash-hole resulting from the differences of range with a sufficient accuracy within the whole band of ranges normally used with the ammunitions used; the arrangement of all the above mentioned elements on the frame being such that upon orienting the circular protractor according to the required direction of fire, sliding the range protractor so that its index line intersects the straight scale corresponding to the ammunition used at the point representative of the firing distance on said scale and sliding the direction protractor so as to bring in registration the center of the circular protractor and the graduations of the range protractor indicating the firing distance, it is possible to read directly on the frame in units of elevation angle the individual range corrections of all the guns of the battery and in units of deflection angle the individual direction corrections of all the guns of the battery; and a muzzle-velocity corrector slidable on the frame along the direction perpendicular to the direction of fire and provided with a plurality of straight parallel scales directed perpendicularly to the direction of fire, graduated in ranges and each of said scales corresponding to a well-defined ammunition, said scales being return bent in such a way that a portion of the scale is adapted to plunging fire, while the other portion is adapted to vertical fire, with a scale perpendicular to said ammunition scales graduated in muzzle-velocity differences, the graduations of the ammunitions scales being designed so that for different ammunitions the points occupying on said scales the same relative positions with respect to the muzzle-velocity scale correspond to a same elevation shift for a same value of cone lead of the related gun with respect to the reference gun of the fire-tables, and with a plurality of index points each of which is located on one of said scales, the position of each index point being fixed so that when the straight index line of the range protractor registers therewith, the corrector gives the relative corrections of flash-hole resulting from the differences of range with a sufficient accuracy within the whole band of ranges normally used with ammunitions used, said muzzle-velocity scale cooperating with the graduated bevel provided on the frame to enable a direct reading on the muzzle-velocity corrector of the individual corrections resulting from the departures of the muzzle-velocities of the other guns with respect to the muzzle-velocity of the base gun, a straight scale being provided on the frame being used as sight axis for determining the elevation corrections resulting from the altitude differences between the gun stations and/or the various parts of the target, and a target ruler provided on the frame and the edge of which comprises a graduation relating to the depth of the target and the symmetry axis of which is provided with a dual graduation relating to the width of the target, one of the graduations being intended for the case where the width of the covered zone is equal to the target front and the other for the case where the width of the covered beaten zone is equal to between ¾ and ⅝ of the target front.

ANDRÉ JOSEPH ALEXANDRE BESSIÈRE.

REFERENCES CITED

The following references are of record in the file of this patent:

FOREIGN PATENTS

| Number | Country | Date |
|---|---|---|
| 227,062 | Great Britain | Jan. 8, 1925 |
| 468,996 | Great Britain | July 16, 1937 |
| 523,382 | Great Britain | July 12, 1940 |
| 306,349 | Germany | June 1, 1920 |